(12) United States Patent
Laurent et al.

(10) Patent No.: US 8,950,456 B2
(45) Date of Patent: Feb. 10, 2015

(54) RADIAL TIRE WITH SPECIFIED BEAD FOR LIGHT HEAVY-WEIGHT VEHICLE

(75) Inventors: Christophe Laurent, Le Cendre (FR); David Dean, Aubiere (FR); David Lavialle, Clermont-Ferrand (FR)

(73) Assignees: Compagnie Generale des Etablissements, Clermont-Ferrand (FR); Michelin Recherche et Techique S.A., Granges-Paccot (CH)

( * ) Notice: Subject to any disclaimer, the term of this patent is extended or adjusted under 35 U.S.C. 154(b) by 245 days.

(21) Appl. No.: 13/508,855

(22) PCT Filed: Oct. 25, 2010

(86) PCT No.: PCT/EP2010/066048
§ 371 (c)(1),
(2), (4) Date: Jun. 27, 2012

(87) PCT Pub. No.: WO2011/057889
PCT Pub. Date: May 19, 2011

(65) Prior Publication Data
US 2012/0267028 A1  Oct. 25, 2012

(30) Foreign Application Priority Data
Nov. 13, 2009  (FR) .................................... 09 58020

(51) Int. Cl.
| | |
|---|---|
| B60C 15/06 | (2006.01) |
| B60C 15/00 | (2006.01) |
| B60C 15/02 | (2006.01) |
| B60B 21/10 | (2006.01) |
| B60C 1/00 | (2006.01) |

(52) U.S. Cl.
CPC ......... *B60C 15/06* (2013.01); *B60C 2001/0058* (2013.04); *B60C 15/02* (2013.01); *B60C 15/00* (2013.01); *B60C 2015/009* (2013.04); *B60C 15/0607* (2013.04); *B60C 2015/0617* (2013.04); *B60B 21/104* (2013.01); *B60C 1/00* (2013.01); *B60C 15/0009* (2013.04); *B60C 2015/0621* (2013.04); *B60C 2015/0614* (2013.04)
USPC ........... 152/541; 152/543; 152/546; 152/547; 152/554

(58) Field of Classification Search
USPC .................. 152/541, 543, 546, 547, 554, 540
See application file for complete search history.

(56) References Cited

U.S. PATENT DOCUMENTS

| | | | |
|---|---|---|---|
| 5,196,077 A | 3/1993 | Kaga | |
| 5,433,257 A | 7/1995 | Yamaguchi et al. | |
| 2008/0295946 A1 | 12/2008 | Kraus et al. | |
| 2009/0056851 A1 | 3/2009 | Maruoka | |

OTHER PUBLICATIONS

International Search Report (PCT/ISA/210) issued on Dec. 27, 2010, by the European Patent Office as the International Searching Authority for International Application No. PCT/EP2010/066048.

*Primary Examiner* — Adrienne C Johnstone
(74) *Attorney, Agent, or Firm* — Dickinson Wright PLLC

(57) ABSTRACT

An assembly including a tire having beads, said bead axially including outside the turn-up a layer of a material defining a bead outer profile, such that the distance A, between the carcass frame and the bead outer profile, is as defined in formula (Z), B being the distance between the end of the turn-up, said bead including first and second profiles between the carcass frame and the turn-up, the first profile extends from the bead wire and is made of a material having an extension secant modulus at a 10% elongation higher than 20 MPa, a second profile arranged in the bead such as to be in contact with a surface of the first profile and the turn-up, made of a material having an extension secant modulus at a 10% elongation of at least 7 MPa and an extension secant modulus at a 100*% extension of at least 4.5 MPa.

9 Claims, 1 Drawing Sheet

RADIAL TIRE WITH SPECIFIED BEAD FOR LIGHT HEAVY-WEIGHT VEHICLE

BACKGROUND

1. Field

The present disclosure relates to a tire assembly comprising a mounting rim and a tire with radial carcass reinforcement and more particularly to a tire of the light heavy-weight (light truck) type intended to be fitted to a vehicle such as a van. It relates more specifically to a new bead structure for such tires.

2. Description of Related Art

In general, a tire of the kind considered comprises a carcass reinforcement formed of at least one ply of metal cords or textile cords, this carcass reinforcement being anchored in each bead to at least one bead wire, forming a turned-back portion. The carcass reinforcement is radially surmounted by a crown reinforcement, made up of at least two plies of metal cords which are crossed from one ply to the next, making angles of between 10° and 45° with the circumferential direction. The turned-back portion of carcass reinforcement comprises, when viewed in a radial plane of section (which means a plane containing the axis of rotation of the tire) one end situated in an appropriate distance away from the axis of rotation of the tire so as to ensure good mechanical anchorage of the bead when the tire is in use. Between the carcass reinforcement and the turned-back portion there are one or more profiled elements based on rubber compounds.

This tire is intended to be mounted on a mounting rim comprising a part (known as the rim seat) intended to accept the beads of a tire and, axially on the outside of each seat, a flange intended to limit the axial movement of the beads of the tire at the time of inflation. It is well known that one same light truck or van tire can be mounted on a number of rims having different flange geometries. What is meant here by different geometries is that these rims differ in terms of different flange heights and different rim hook curvatures. Depending on the height and shape of the rims, it will be readily appreciated that stress levels may be particularly penalizing to the endurance of the beads and therefore that of the tire. The most penalizing situation is obtained with low rim heights and rim hooks with small radii of curvature.

Solutions have been put forward for improving the endurance of the beads of such tires. In particular, U.S. Pat. No. 5,433,257 describes a bead structure in which a first profiled element of triangular section bears against the bead wire of circular section and extends, tapering radially outwards, as far as a point situated substantially at the same height as the end of the turned-back portion of carcass reinforcement. This first profiled element is pressed firmly against the carcass reinforcement. Furthermore, a second profiled element extends the first out to a point radially on the outside of the end of the turned-back portion; this second profiled element provides the connection by contact between the first profiled element and the turned-back portion of carcass reinforcement. The first profiled element is made of a material having an elastic modulus at 100% extension that is equal to 6 MPa while the second profiled element is made of a material having an elastic modulus at 100% extension that is equal to at least 1.5 MPa and at most equal to 3.5 MPa.

In the structure according to the prior art and in a radial plane of section, which means a plane containing the axis of rotation, the distance to the axis of rotation of the end point of the turned-back portion is greater than the distance of the point of the mounting rim on which the tire is intended to be mounted. Finally, an additional reinforcement comprising a plurality of reinforcing elements making an angle different from the angle of the reinforcement elements of the carcass reinforcement is provided, in order partially to envelop the turned-back portion and the carcass reinforcement in the bead. Rubber compounds are also provided to decouple the turned-back portion from the additional reinforcement. Further, a profiled element is provided axially on the outside of the additional reinforcement in order to rest against the rim flange.

This structure, despite having good endurance performance, confers additional weight upon the tire and it is known that additional weight is something particularly closely monitored in the development of new light trucks and vans.

The sought-after objective is a tire bead structure for light trucks and vans which is lighter in weight without that leading to a loss in performance, particularly in mechanical integrity as the beads heat up as a result of repetitive braking. Research conducted by the applicants has revealed that the bead structures recalled above can be markedly improved through a careful choice of the profiled elements and of the rubber-based materials of which the tire beads are made.

SUMMARY

To this end, the invention proposes, in an embodiment, a tire assembly comprising a mounting rim and a tire with a radial carcass reinforcement comprising radially directed (metal or textile) reinforcing elements, this tire comprising beads intended to come into contact with a mounting rim. This mounting rim comprises a seat extended axially outwards by a part forming a rim flange of which the radially outermost points are at a distance Rr from the axis of rotation of the tire. When viewed in a radial plane of section (which means a plane of section containing the axis of rotation), this flange is made up of a straight part extending the rim seat, this straight part being extended radially outwards by a hook-shaped part.

The carcass reinforcement, in an embodiment, is turned back in each bead around a braided bead wire made up of a plurality of metal threads, this bead wire having a cross section, which means a section in a radial plane of section, that is substantially circular to form a turned-back portion. When viewed in a radial plane of section, this turned-back portion has one end situated a distance Hc from the point K of the bead wire, viewed in the same radial plane of section, that is radially the innermost point. This distance Hc is at least equal to 18 mm and at most equal to 26 mm.

This bead comprises, arranged between the carcass reinforcement and the turned-back portion, two profiled elements made of rubber compound. A first profiled element extends from the bead wire along the turned-back portion out to a point situated a distance He away, this distance being measured, in a radial plane of section, with respect to the radially innermost point of the bead wire. The length of mechanical coupling between this first profiled element and the carcass reinforcement is denoted L1 and is measured between the radially outermost end of the first profiled element and an axially innermost point of contact with the bead wire. The length of mechanical coupling of this first profiled element with the turned-back portion is denoted L2; this length L2 is measured between the radially outermost point in contact with the turned-back portion and an axially outermost point of contact with the bead wire. The radially outermost point of the first profiled element is a distance Hi away from the radially innermost point of the bead wire. This first profiled element is made of a material having a secant extension modulus at 10% elongation that is greater than 20 MPa, more preferably greater than 30 MPa. More preferably still, the modulus of this first profiled element is at least equal to 40 MPa and at most equal to 70 MPa.

A second profiled element is arranged in the bead in such a way as to be in contact with one face of the first profiled element and with the turned-back portion of carcass reinforcement out from a height equal to He. This second profiled element extends very much radially beyond the end of the turned-back portion out to a distance H2 measured with respect to the radially innermost point of the bead wire. The material of this second profiled element has a secant extension modulus at 10% elongation that is at least equal to 7 MPa and a secant extension modulus at 100% elongation that is at least equal to 4.5 MPa.

This second profiled element, in the region of the turned-back end, has a thickness B at least equal to 1 mm and at most equal to the axial width of the bead wire (width measured in the direction parallel to the axis of rotation and corresponding, in the case of a bead wire of circular transverse section, to the diameter of this bead wire).

The height He of the first profiled element in contact with the turned-back portion of carcass is such that the length of bonding L2 of the first profiled element to the turned-back portion is at most equal to half the length Lr of the turned-back portion (this length Lr being measured as being the length of turn back in contact with the first and second profiled elements, i.e. the length of contact measured from the end of the turned-back portion to the axially outermost point of contact with the bead wire).

This bead further comprises, axially on the outside of the turned-back portion of carcass reinforcement, a filling profiled element and a protective profiled element, the latter—which is axially on the outside of the filling profiled element—being designed to come into contact with the rim flange. In the tire according to the invention, these protective and filling profiled elements have appropriate thicknesses so that the distance A between the carcass reinforcement and the bead external profiled element in that part thereof that can come into contact with the rim flange is such that ¼ A≤B≤½ A, B measuring the distance separating the end of the turned-back portion of carcass reinforcement from the carcass reinforcement and being measured along a straight line perpendicular to the carcass reinforcement. The rim preferably used corresponds to the one that has the smallest flange out of all the rim flanges that can be used on which to mount the tire in question.

The distances A and B are measured from the outside of the reinforcing elements of the carcass reinforcement or of the turned-back portion (which means from the external surface of the reinforcing elements).

Advantageously, the first profiled element is preferably chosen as being a rubber compound containing an additional reinforcing resin consisting for example of a methylene acceptor such as a formophenolic resin, at a preferred content of between 3 and 15 phr, more preferably of between 5 and 12 phr, and a methylene donor such as hexamethylenetetramine (HMT) or even hexamethoxy-methoxylmelamine (HMMM, also known as H3M), at a preferred content of between 1 and 10 phr, and more preferably of between 3 and 7 phr ("phr" corresponds to the number of parts per weight of component per hundred parts of rubber).

In one aspect of the invention, the thickness of the second profiled element is substantially equal to the thickness of the filling profiled element considered at the same level (notably at the end of the turned-back portion of carcass reinforcement) to allow better absorption of the bending over the rim flanges and thus reduce the wear of the bead through friction against said flanges. Thus chosen, these thicknesses prevent the turned-back portion from being subjected to compressive stress when deformed in bending during running.

According to another aspect of the invention, the bead wire that anchors the carcass reinforcement is surrounded by a layer of elastomer material of which the secant elastic modulus in tension is of substantially equal to the secant elastic modulus in tension of the material of which the first profiled element is made. Substantially equal here means that the materials may be identical or alternatively may have modulus values that differ by 10% at most.

In another aspect is disclosed an assembly formed of a radial carcass reinforcement tire comprising radially directed reinforcing elements and a mounting rim, wherein the radial carcass reinforcement tire comprises beads intended to come into contact with the mounting rim, wherein the mounting rim comprises a seat extended axially on the outside by a part forming a rim flange the radially outermost part of which is at a distance Rr from the axis of rotation and which has a circular shape in a plane of section containing the axis of rotation, wherein each bead comprises an anchoring bead wire comprising a core, wherein the tire is reinforced by the carcass reinforcement formed of a ply of the radially directed reinforcing elements, which carcass reinforcement in each bead is turned back around the anchoring bead wire to form a an axially outer turned-back portion which, in a radial plane of section, has one radially outermost end positioned, once the tire has been mounted on its mounting rim, at a radial distance Hc from the radially innermost point K of the bead wire which is at least equal to 18 mm and at most equal to 26 mm, wherein each bead comprises, axially on the outside of the turned-back portion of carcass reinforcement, a thickness of material defining a bead external profiled element, wherein the bead external profiled element is such that the distance A measured between the carcass reinforcement and the bead external profiled element in its part that can be in contact with the rim flange is such that ¼ A≤B≤½ A wherein B is the distance separating the carcass reinforcement from the end of the turned-back portion of carcass reinforcement, these distances A and B being measured on a straight line perpendicular to the carcass reinforcement and passing through the radially outermost end of the turned-back portion, wherein each bead comprises, positioned between the carcass reinforcement and the turned-back portion, a first and a second profiled element, wherein the first profiled element extends from the bead wire out to a maximum radial distance Hi and is in contact with the turned-back portion out to a radial distance He, these distances Hi and He being measured, in a meridian plane of section, with respect to the radially innermost point of the bead wire, wherein the first profiled element being made of a material having a secant extension modulus at 10% elongation that is greater than 20 MPa, and wherein the second profiled element is arranged in the bead in such a way as to be in contact with one face of the first profiled element and with the turned-back portion of carcass reinforcement out from a radial distance He, the second profiled element extending out to a maximum radial distance H2 also measured with respect to the radially innermost point of the bead wire, this second profiled element being made of a material having a secant extension modulus at 10% elongation that is at least equal to 7 MPa and a secant extension modulus at 100% elongation that is at least equal to 4.5 MPa, and wherein the second profiled element forms the distance B such that the first profiled element does not contact the straight line on which the distance B is measured, the distance B being equal to between 1 mm and the axial width of the bead wire, and wherein the radial distance He of the first profiled element in contact with the turned-back portion of carcass is such that the coupling length L2, measured between the radially outermost point in contact with the turned-back portion and the axially outermost point Ae of the contact with the bead wire is at most equal to half the length Lr of the turned-back portion, the length Lr being measured as the length of turned-back portion in contact with the first and second profiled elements, i.e. the contact length measured from the end of the turned-back portion to the axially outermost point of contact Ae of the bead wire.

Definitions:

Radially towards the outside means the direction perpendicular to the axis of rotation and away from the said axis. Axially on the inside means an orientation pointing towards the inside of the internal cavity of the tire in which an inflation pressure acts.

A radial plane of section means a plane containing the axis of rotation.

Advantageously, the end of the second profiled element that is radially outermost with respect to the axis of rotation is at a distance H2 from the radially innermost point of the bead wire and is at least equal to 1 times and at most equal to 2.5 times the distance Hc from the end of the turned-back portion to the radially innermost point of the bead wire.

Advantageously, the distance He measuring the height of contact between the first profiled element and the turned-back portion of carcass reinforcement is at least equal to the axial width of the bead wire and at most equal to 0.75 times the distance Hc of the end of the turned-back portion.

The distance Hi of the last point of the first profiled element in contact with the carcass reinforcement is greater than the distance He measuring the height of contact between the first profiled element and the turned-back portion. This distance Hi is at least equal to 0.5 times and at most equal to 1.25 times the distance Hc.

BRIEF DESCRIPTION OF DRAWINGS

The features of embodiments of the invention will be better understood with the aid of the description which follows and which refers to the drawing, which by way of nonlimiting example illustrates one embodiment, in which drawing.

DETAILED DESCRIPTION OF SPECIFIC EMBODIMENTS

Figure 1:
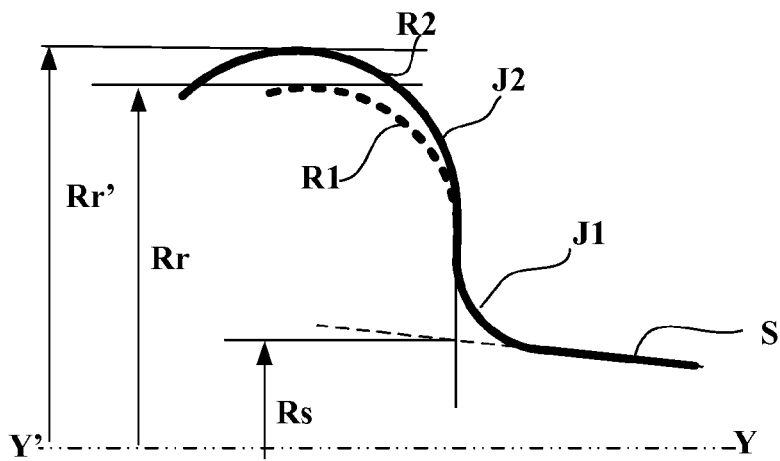
FIG. 1 shows, in meridian section, a number of profiles of mounting rim for one and the same tire intended for a van.
Figure 2:
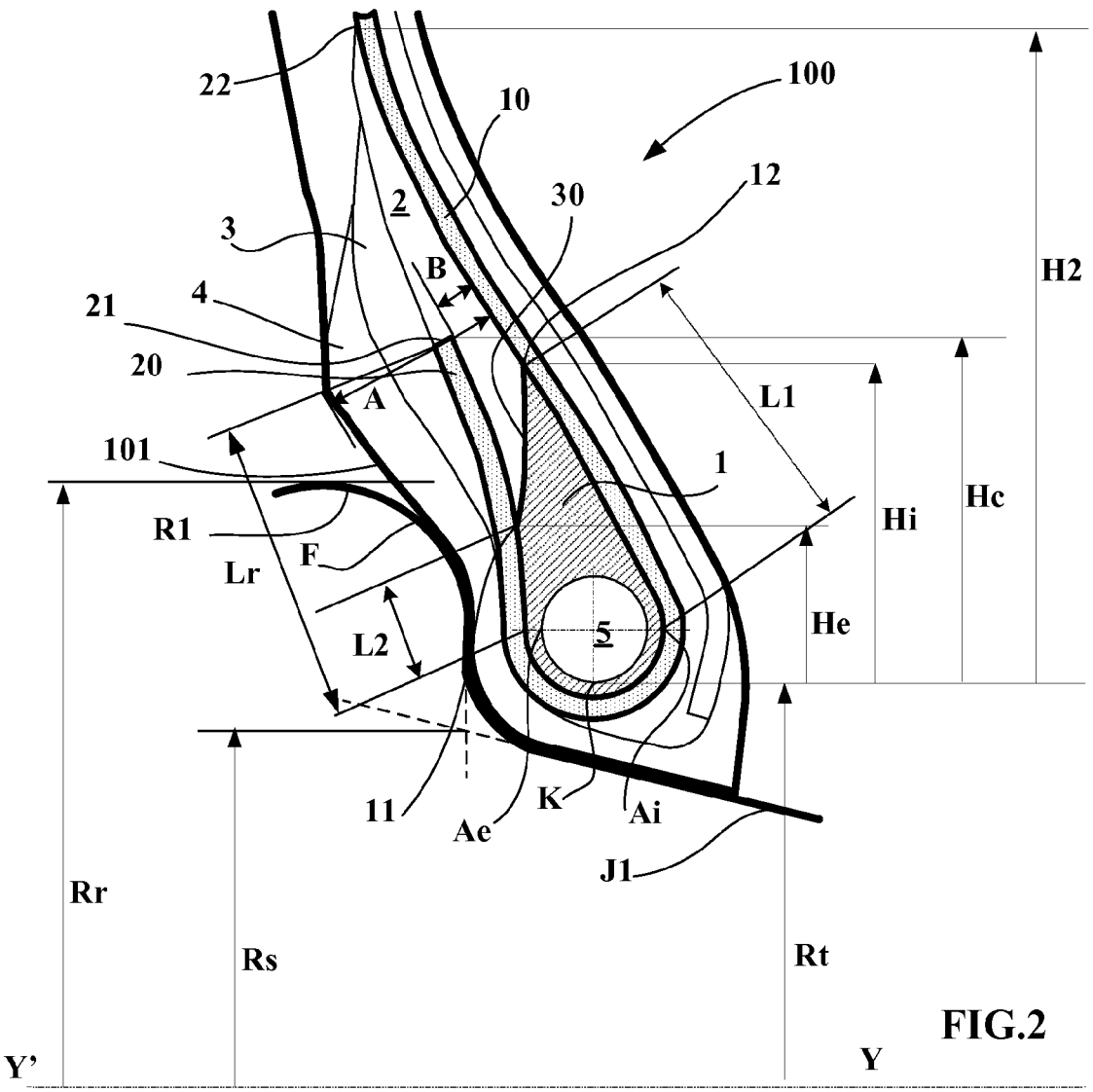
FIG. 2 is a schematic cross section on a radial plane through a bead according to the invention.

FIG. 1 partially shows two mounting rims J1 and J2 for a tire intended for a van (and notably a tire according to the invention and as depicted in FIG. 2). These mounting rims comprise a part forming a rim seat S which is inclined by an angle equal to 5 degrees with respect to the direction of the axis of rotation YY', these rim seats S being intended to seat the beads of the tire. Axially on the outside of these seats are the flanges R1 and R2 the function of which is to limit the axial movement of the beads. These flanges are formed of a planar part substantially perpendicular to the axis of rotation YY', extended radially outwards by a curved part that forms a kind of hook shape. One discerning feature in the use of certain van tires is that they can be mounted on rims which differ from one another in terms of the geometry of their rims. The nominal diameter of this rim is obtained as being twice the distance to the axis of rotation from the point of intersection between the straight part of the flange and the rim seat.

In the case shown, a rim J1 comprises a flange R1 the radially outermost points of which are at a distance Rr from the axis of rotation. A rim J2 comprises a flange R2 the radially outermost points of which are at a distance Rr' from the axis of rotation, this distance Rr' being greater than the distance Rr. In the case shown, these two rims have seats of the same geometry, the rim J1 comprising a rim hook which has a more pronounced curvature than the hooked part of the other rim J2. It is this rim J1, for which the profile around which the beads of a tire become wrapped has a smaller radius of curvature which proves to be more penalizing in terms of the endurance of these beads.

FIG. 2 shows a bead 100 of a van tire of size 195/75 R 16 according to the invention.

This tire is depicted mounted on a mounting rim J1 the technical name for which is 6J16 in the ETRTO standard. This rim shown in FIG. 1 is considered to be the most penalizing to tire beads. The nominal radius Rs is equal to 203 mm and the radius of the radially outermost points on the flange are a distance Rr of 220.3 mm away from the axis of rotation. The tire inflated to its nominal pressure of 6 bars is intended to be able to withstand a load of 1325 kg.

This tire comprises a carcass reinforcement 10 formed of a single ply of rubber reinforced with metal reinforcements of structure 12-15NF, which means 12 threads measuring $15/100$ of a millimeter in diameter. These reinforcing elements of the carcass reinforcement are directed radially in the tire, which means so that they make an angle equal to or close to 90 degrees with a circumferential tangential direction and at a pitch of 1.25 mm, this pitch being measured at the radially innermost point of the anchoring bead wire. The rubber compound of this reinforcement has a secant modulus at 10% elongation measured at 23° C. of 8.2 MPa.

The bead wire 5 is obtained as a helical winding around a circular core and has a cross section of substantially circular shape with a mean diameter at least equal to 5 mm and at most equal to 10 mm and in this particular instance equal to 6.8 mm. This bead wire has an internal radius Rt equal in this particular instance to 205.5 mm. In this particular instance, the bead wire is coated with the material of which the first profiled element is made, making the complete circuit of the said bead wire with a thickness that is substantially uniform at least in the radially internal part of the bead wire.

The carcass reinforcement 10 within each bead is wrapped around the bead wire 5 from the inside of the tire outwards to form a turned-back portion 20 extended substantially parallel to the carcass reinforcement 10 and radially outward with respect to the axis of rotation. When viewed in a radial plane of section corresponding to that of the figure, this turned-back portion 20 comprises an end 21 situated at a distance Hc from the radially innermost point K of the bead wire 5 and which in this particular instance is equal to 18.2 mm (namely 1.05 times the height of the rim hook of the mounting rim). Note that the drawing is given merely by way of indication and that it is not necessarily to scale.

Between the carcass reinforcement 10 and the turned-back portion 20 thereof, a first profiled element 1 extends from the bead wire 5 out to a maximum distance Hi here equal to 19.1 mm, this distance being measured, in a radial plane of section, with respect to the radially innermost point K of the bead wire. This first profiled element 1 is in contact with the turned-back portion 20 out to a distance He equal to 10.6 mm (distance measured with respect to the radially innermost point K of the bead wire).

This first profiled element 1 is made of a material having a secant extension modulus at 10% elongation and at 23° C. that is greater than 20 MPa and, in this particular instance, equal to 52.4 MPa. This first profiled element 1 is in contact with the bead wire 5 and with the turned-back portion over a length L2, this length being considered between the radially outermost point in contact with the turned-back portion (point of height He) and the point Ae which is defined as being the axially outermost point on the bead wire. In this particular instance this length L2 is substantially equal to 7 mm.

Furthermore, a second profiled element 2 is arranged in the bead so as to be in contact with one face of the first profiled element and the turned-back portion of carcass reinforcement out from a point situated at a distance He measured with respect to the point K. The turned-back portion of carcass is in contact with this second profiled element 2 between a point situated at a distance He and the end 21 of said turned-back portion that is radially furthest from the axis of rotation.

This second profiled element 2 extends radially outwards out to a distance H2, measured with respect to the radially innermost point K of the bead wire, that in this particular instance is equal to 39 mm. This second profiled element 2 is made of a material having a secant extension modulus at 10% elongation and at a temperature of 23° C., that is at least equal to 7 MPa and in this particular instance equal to 7.8 MPa and a secant extension modulus at 100% elongation and at a temperature of 23° C., that is at least equal to 4.5 MPa, and in this particular instance equal to 4.5 MPa. By definition, and for all distances measured from the point K, these distances correspond to the radii of the circles centered on the point K and passing through the points whose position is to be pinpointed with respect to said point K. In this particular instance, the total length of coupling Lr between the turned-back portion 20 and the first and second profiled elements 1, 2 is substantially equal to 15.7 mm. The first and second profiled elements 1 and 2 respectively have one face 30 in common, this common face 30 extending between the radially outermost point 12 of the first profiled element 1 and that point 11 on the same first profiled element 1 that is situated at a distance He from the point K of the bead wire 5.

The depiction of the bead wire 100 according to the invention shows this bead wire as it is when the tire is mounted and inflated to its nominal pressure. In this configuration, the bead comprises a protective profiled element 4 axially on the outside and which is formed of a material having appropriate properties so that it can withstand the movements of flexing against the rim flange as the tire runs along. This material is said to be protective against excessively rapid bead wear against the metal of which the rim is formed. In this particular instance, this protective material has an extension modulus at 10% and at 23° C. which is equal to 6.6 MPa. Between this protective profiled element 4 and the turned-back portion 20 there is a filling profiled element 3 capable of absorbing the stresses that develop axially on the outside of the turned-back portion during bending cycles resulting from the running of the tire. The material of the filling profiled element 3 has an elastic modulus at 10% and 23° C. which is equal to 3.7 MPa. This bead 100 comprises, axially on the outside of the turned-back portion 20 of carcass reinforcement, a thickness of material defining a bead external profiled element 101. Just part of this bead external profiled element 101 may be in contact with the rim flange R1.

In this configuration in which the tire is merely inflated, it will be noted that the protective profiled element 4 of the bead is in contact with the rim flange R1 out to a point F. The distance B separating the end of the turned-back portion of carcass reinforcement from this reinforcement is equal to 3.6 mm (measurement made between the carcass reinforcements and the turned-back portion). The distance A measured at the same point between the carcass reinforcement and the external profiled element of the bead is, in this particular instance, equal to 11.9 mm. The parameters A and B satisfy the relationship $\frac{1}{4} A \leq B \leq \frac{1}{2} A$ (B is actually comprised between 2.98 mm and 5.95 mm in the example described).

Each time the relevant part of the tire passes through the contact patch, each of its beads 100 wraps at least partially around a flange and more precisely around the radially external part that forms a kind of hook shape. Under these cyclic stress loadings, the turned-back portion 20 is highly stressed and, what is more, these stresses are amplified by high operating temperatures resulting from heating notably as a result of increases in temperature of the braking components of the vehicle.

It is found that after running at stabilized load and speed, the maximum temperature in this bead according to the invention is at most equal to 90° C. whereas in the conventional structures, notably those of the prior art cited in this document, it is in excess of 95° C.

The invention must not be interpreted as being limited to the example described and various modifications can be made thereto without departing from the scope of the invention.

The invention claimed is:

1. An assembly formed of a radial carcass reinforcement tire comprising radially directed reinforcing elements and a mounting rim, wherein the radial carcass reinforcement tire comprises beads intended to come into contact with the mounting rim, wherein the mounting rim comprises a seat extended axially on the outside by a part forming a rim flange the radially outermost part of which is at a distance Rr from the axis of rotation and which has a circular shape in a plane of section containing the axis of rotation, wherein each bead comprises an anchoring bead wire comprising a core, wherein the tire is reinforced by the carcass reinforcement formed of a ply of the radially directed reinforcing elements, which carcass reinforcement in each bead is turned back around the anchoring bead wire to form a an axially outer turned-back portion which, in a radial plane of section, has one radially outermost end positioned, once the tire has been mounted on its mounting rim, at a radial distance Hc from the radially innermost point K of the bead wire which is at least equal to 18 mm and at most equal to 26 mm, wherein each bead comprises, axially on the outside of the turned-back portion of carcass reinforcement, a thickness of material defining a bead external profiled element, wherein the bead external profiled element is such that the distance A measured between the carcass reinforcement and the bead external profiled element in its part that can be in contact with the rim flange is such that $$\frac{1}{4} A \leq B \leq \frac{1}{2} A$$

wherein B is the distance separating the carcass reinforcement from the end of the turned-back portion of carcass reinforcement, these distances A and B being measured on a straight line perpendicular to the carcass reinforcement and passing through the radially outermost end of the turned-back portion, wherein each bead comprises, positioned between the carcass reinforcement and the turned-back portion, a first and a second profiled element, wherein the first profiled element extends from the bead wire out to a maximum radial distance Hi and is in contact with the turned-back portion out to a radial distance He, these distances Hi and He being measured, in a meridian plane of section, with respect to the radially innermost point of the bead wire, wherein the first profiled element being made of a material having a secant extension modulus at 10% elongation that is greater than 20 MPa, and wherein the second profiled element is arranged in the bead in such a way as to be in contact with one face of the first profiled element and with the turned-back portion of carcass reinforcement out from a radial distance He, the second profiled element extending out to a maximum radial distance H2 also measured with respect to the radially innermost point of the bead wire, this second profiled element being made of a material having a secant extension modulus at 10% elongation that is at least equal to 7 MPa and a secant extension modulus at 100% elongation that is at least equal to 4.5 MPa, and wherein the second profiled element forms the distance B such that the first profiled element does not contact the straight line on which the distance B is measured, the distance B being equal to between 1 mm and the axial width of the bead wire, and wherein the radial distance He of the first profiled element in contact with the turned-back portion of carcass is such that the coupling length L2, measured between the radially outermost point in contact with the turned-back portion and the axially outermost point Ae of the contact with the bead wire is at most equal to half the length Lr of the turned-back portion, the length Lr being measured as the length of turned-back portion in contact with the first and second profiled elements, i.e. the contact length measured from the end of the turned-back portion to the axially outermost point of contact Ae of the bead wire.

2. The assembly according to claim 1 wherein the first profiled element is made of a material having a secant extension modulus at 10% elongation that is at least equal to 40 MPa and at most equal to 70 MPa.

3. The assembly according to claim 1 wherein the material that forms the first profiled element is a rubber compound containing an additional reinforcing resin made up of a methylene acceptor and a methylene donor.

4. The assembly according to claim 3, wherein the methylene donor is hexamethylenetetramine (HMT) or hexamethoxy-methylmelamine (HMMM, also known as H3M).

5. The assembly according to claim 3, wherein the methylene donor is present in an amount of between 1 and 10 phr.

6. The assembly according to claim 3, wherein the methylene acceptor is a formophenolic resin.

7. The assembly according to claim 3, wherein the methylene acceptor is present in an amount of between 3 and 15 phr.

8. The assembly according to claim 1 wherein the distance H2 is between 1 and 2.5 times the distance Hc.

9. The assembly according to claim 1 wherein the distance Hi is greater than the distance He, and wherein this distance Hi is between 0.5 times and 1.25 times the distance Hc.

* * * * *